United States Patent
Wolfs et al.

(10) Patent No.: US 12,540,406 B2
(45) Date of Patent: Feb. 3, 2026

(54) APPARATUSES AND METHODS FOR MULTI-STAGE ELECTROLYSIS

(71) Applicant: NORAM ELECTROLYSIS SYSTEMS INC., Vancouver (CA)

(72) Inventors: Warren Wolfs, Vancouver (CA); Clive Brereton, Vancouver (CA); Alex Sylvester, Vancouver (CA); Eric Mielke, Vancouver (CA); Jean-Francois Magnan, Vancouver (CA); Andrés Mahecha-Botero, Vancouver (CA)

(73) Assignee: NORAM ELECTROLYSIS SYSTEMS INC., Vancouver (CA)

( * ) Notice: Subject to any disclaimer, the term of this patent is extended or adjusted under 35 U.S.C. 154(b) by 0 days.

(21) Appl. No.: 18/741,456

(22) Filed: Jun. 12, 2024

(65) Prior Publication Data

US 2024/0401219 A1    Dec. 5, 2024

Related U.S. Application Data

(63) Continuation of application No. PCT/CA2023/050733, filed on May 29, 2023.

(51) Int. Cl.
*C25B 1/04* (2021.01)
*C25B 9/23* (2021.01)
(Continued)

(52) U.S. Cl.
CPC .............. *C25B 1/04* (2013.01); *C25B 9/23* (2021.01); *C25B 9/67* (2021.01); *C25B 9/77* (2021.01);
(Continued)

(58) Field of Classification Search
CPC ......... C25B 1/04; C25B 15/08; C25B 15/083; C25B 15/087; C25B 9/23; C25B 9/67;
(Continued)

(56) References Cited

U.S. PATENT DOCUMENTS

| 4,247,376 A | 1/1981 | Dempsey et al. |
| 4,340,452 A | 7/1982 | DeNora |

(Continued)

FOREIGN PATENT DOCUMENTS

| CN | 218115075 U | 12/2022 |
| EP | 2039806 A1 | 3/2009 |

(Continued)

*Primary Examiner* — Ciel P Contreras
(74) *Attorney, Agent, or Firm* — Oyen Wiggs Green & Mutala LLP

(57) ABSTRACT

An multi-stage electrolyzer cell is disclosed. The multi-stage electrolyzer cell comprises an anode, a cathode and at least one ion exchange membrane separating the anode and the cathode. The anode and cathode are exposed in the respective anode chamber and cathode chamber. At least one partition is arranged within at least one of the anode and cathode chambers, dividing the at least one chamber into a plurality of process stages. Each of the partitions comprises a feed port, allowing an electrolyte solution to transport sequentially through each of the plurality of process stages. Means are arranged to transport the electrolyte solution through each one of the plurality of process stages. A multi-stage electrolytic method is also disclosed.

27 Claims, 11 Drawing Sheets

(51) Int. Cl.
*C25B 9/67* (2021.01)
*C25B 9/77* (2021.01)
*C25B 15/021* (2021.01)
*C25B 15/08* (2006.01)

(52) U.S. Cl.
CPC .......... *C25B 15/021* (2021.01); *C25B 15/083* (2021.01); *C25B 15/087* (2021.01)

(58) Field of Classification Search
CPC ........... C25B 9/77; C25B 15/021; C25B 9/19; C25B 9/70
See application file for complete search history.

(56) References Cited

U.S. PATENT DOCUMENTS

| | | |
|---|---|---|
| 4,360,416 A | 11/1982 | Davidson et al. |
| 5,066,378 A | 11/1991 | Meneghini |
| 5,225,060 A | 7/1993 | Noaki et al. |
| 5,693,202 A | 12/1997 | Gestermann et al. |
| 5,712,055 A | 1/1998 | Khandkar et al. |
| 6,773,561 B1 | 8/2004 | Noaki et al. |
| 9,463,988 B2 | 10/2016 | Liang et al. |
| 10,369,522 B2 | 8/2019 | Kofler et al. |
| 10,480,086 B2 | 11/2019 | Simpson Alvarez |
| 11,390,956 B1 | 7/2022 | McWaid et al. |
| 11,431,012 B1 | 8/2022 | Gilliam et al. |
| 11,444,304 B1 * | 9/2022 | McWaid .................. C25B 9/19 |
| 2003/0155232 A1 | 8/2003 | Katayama et al. |
| 2006/0042935 A1 | 3/2006 | Houda et al. |
| 2007/0235338 A1 | 10/2007 | Kodama et al. |
| 2008/0296173 A1 * | 12/2008 | Mishra .................. C25B 15/00 204/279 |
| 2010/0065421 A1 * | 3/2010 | Bohnstedt ................ C25B 9/70 204/263 |
| 2013/0048509 A1 | 2/2013 | Balagopal et al. |
| 2014/0238869 A1 | 8/2014 | DiMascio et al. |
| 2014/0327165 A1 | 11/2014 | Chen |
| 2017/0058414 A1 | 3/2017 | Simpson Alvarez |
| 2018/0282884 A1 | 10/2018 | Takahashi et al. |
| 2019/0085472 A1 * | 3/2019 | Willauer ................ C25B 15/08 |
| 2020/0283919 A1 | 9/2020 | Donst et al. |
| 2021/0115573 A1 | 4/2021 | Tanaka et al. |
| 2021/0222306 A1 | 7/2021 | Austenfeld |
| 2022/0384829 A1 | 12/2022 | McWaid et al. |
| 2023/0088736 A1 | 3/2023 | Tanaka |
| 2023/0107017 A1 | 4/2023 | Gilliam et al. |

FOREIGN PATENT DOCUMENTS

| | | |
|---|---|---|
| JP | 2004091834 A | 3/2004 |
| JP | 5916013 B2 | 5/2016 |
| JP | 6499151 B2 | 4/2019 |
| WO | 2020220183 A1 | 11/2020 |
| WO | WO-2022156869 A1 * | 7/2022 |

* cited by examiner

APPARATUSES AND METHODS FOR MULTI-STAGE ELECTROLYSIS

CROSS-REFERENCE TO RELATED APPLICATION

This application is a continuation of PCT international application No. PCT/CA2023/050733 filed 29 May 2023 entitled APPARATUSES AND METHODS FOR MULTI-STAGE ELECTROLYSIS which is hereby incorporated herein by reference for all purposes.

FIELD OF THE INVENTION

The invention pertains to apparatuses and methods for electrolysis, in particular those which involve electrolysis through a multi-stage process within a single electrolyzer cell.

BACKGROUND

Electrolyzer cells are known in the art. Conventional electrolyzer cells comprise single-stage chambers, within which an electrolyte solution is well mixed. There are two main single-stage electrolyzers known to be used in the industry, one of which is referred to as a "single-stage 2-compartment cell", and the other a "single-stage 3-compartment cell". A single-stage 2-compartment cell comprises a cathode chamber and an anode chamber separated by an ion exchange membrane. A single-stage 3-compartment cell comprises a cathode chamber, a middle compartment, and an anode chamber separated by two ion exchange membranes. The present invention is directed to an improved electrolyzer cell which can operate electrolytic methods with lower capital and/or operating costs, while achieving high cell performance including one or more of improved current efficiency, feed utilization, electrolyte conversion, and process intensification, as compared to the conventional single-stage electrolyzer cells.

SUMMARY

The invention provides a multi-stage electrolyzer cell. The multi-stage electrolyzer cell comprises an anode chamber, a cathode chamber, and at least one ion exchange membrane separating the anode and cathode chambers. At least one partition is arranged within at least one of the anode chamber and/or the cathode chamber to divide the chamber into a plurality of process stages. The plurality of process stages within a cell compartment comprises a first process stage and one or more subsequent process stages. Each of the partitions comprises a feed port for flowing an electrolyte solution sequentially through each of the process stages, from the first process stage through to a final one of the one or more subsequent process stages. Means are arranged to transport the electrolyte solution through each one of the plurality of process stages. Such transporting means may comprise a fluid inlet arranged at the first process stage for supplying the electrolyte solution into the respective one of the chambers, and a fluid outlet arranged at the last one of the one or more subsequent process stages for discharging an anode or cathode product out of the respective one of the chambers.

An oxidation or reduction reaction occurs in each of the plurality of process stages. The oxidation or reduction reaction yields an oxidation product and a reduction product, respectively. In some embodiments, the oxidation product and/or reduction product comprises a gaseous product. The electrolyzer cell may comprise means for separating a gas from the liquid electrolyte solution at each of the process stages. In some embodiments, such separating means are arranged to separate the gaseous product generated from the oxidation or reduction reaction from the liquid electrolyte solution at each of the process stages.

Another aspect of the invention provides a multi-stage electrolytic method. The electrolytic method may be performed in the multi-stage electrolyzer cell of the present invention. The multi-stage electrolytic method comprises applying an electrical potential across an anode and a cathode, supplying an anolyte solution into an anode chamber within which the anode is exposed, supplying a catholyte solution into a cathode chamber within which the cathode is exposed, oxidizing, at the anode, an anode reactant in the anolyte solution to form an oxidation product, reducing, at the cathode, a cathode reactant in the catholyte solution to form a reduction product, and transporting within one or both of the anode chamber and the cathode chamber, the respective anolyte solution and catholyte solution through a plurality of process stages. The transporting of the solution through the plurality of process stages comprises transporting the solution from a first process stage, and therefrom sequentially through each one of one or more subsequent process stages. At each of the process stages, the anode reactant or the cathode reactant is being oxidized or reduced, respectively. In some embodiments of the invention, the method further comprises the step of separating a gas from a respective one of an anolyte solution and catholyte solution at each of the plurality of process stages. The gas may flow into a gas conduit towards a gas outlet for discharge out of the respective chamber.

In some embodiments, the anolyte solution and/or catholyte solution is supplied to the first process stage of the respective anode chamber and cathode chamber. An anode product and/or a cathode product may be discharged out of the respective chamber from a last one of the one or more subsequent process stages.

One example application of the multi-stage electrolyzer cell and method is in salt splitting, or the process of decomposing a salt. In such example application, the anolyte solution comprises a salt for splitting, and water as an anode reactant. The catholyte solution comprises a base, and water as a cathode reactant. The anode product comprises a salt product which preferably has a concentration less than the concentration of the salt contained in the feed anolyte solution. The cathode product comprises a base product which preferably has a concentration greater than the concentration of the base contained in the feed catholyte solution.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
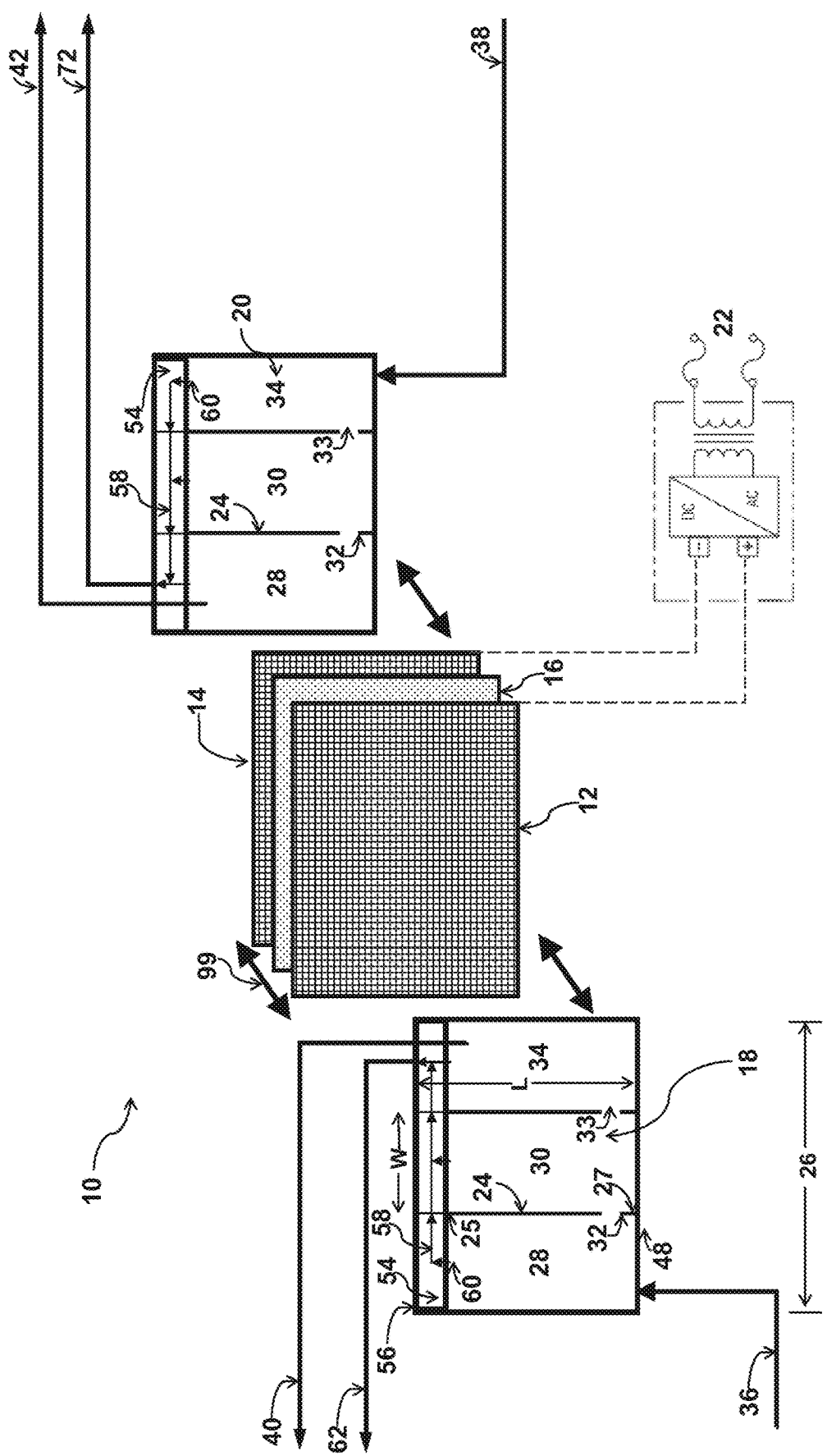
FIG. 1 is a schematic diagram of a multi-stage electrolytic cell according to an example embodiment of this invention. This example embodiment illustrates a multi-stage anode chamber and a multi-stage cathode chamber.

Referring to FIGS. 1-10, in one embodiment, the apparatus of the invention is a multi-stage electrolyzer cell 10. The multi-stage electrolyzer cell 10 comprises an anode 12, a cathode 14 and at least one ion exchange membrane 16 separating the anode 12 and the cathode 14. The anode 12 is exposed in an anode chamber 18. The cathode 14 is exposed in a cathode chamber 20. A power source 22 is connected to apply a potential difference between the anode 12 and cathode 14. A positive electrical charge is applied to the anode 12, and a negative electrical charge is applied to the cathode 14 such that an oxidation reaction takes place at the anode 12 and a reduction reaction takes place at the cathode 14.

The anode 12 and the cathode 14 may comprise any materials suitable for use as an electrode. Such materials may comprise a catalyst suitable for promoting the desired oxidation and reduction reactions at the anode 12 and the cathode 14, respectively. In some embodiments, the anode 12 and/or cathode 14 is made of one or more metal, alloy or a supported metal/alloy catalyst such as a metal coated with a layer of metal oxide as used in commercially available dimensionally stable anodes (DSA).

The at least one ion exchange membrane 16 may be arranged to allow the transport of ions 99 from one of the anode chamber 18 and the cathode chamber 20 to the other one of the chambers 18, 20. In some example embodiments, the ion exchange membrane 16 is arranged to allow the transport of cations from the anode chamber 18 to the cathode chamber 20. In such example embodiments, the at least one ion exchange membrane 16 is a cation exchange membrane. In some example embodiments, the ion exchange membrane 16 is commercially available under the product name Nafion™, Fumatech™, Neosepta™, Flemion™, Aciplex™, etc.

In some embodiments, the ion exchange membrane 16 is arranged substantially parallel to the anode 12 and cathode 14. In some embodiments, the anode 12 and the ion exchange membrane 16 may be in a zero-gap configuration or have a finite gap. In some embodiments, the cathode 14 and the ion exchange membrane 16 may be in a zero-gap configuration or have a finite gap. The gap dimensions have an impact on the efficiency and energy consumption of the process. Process gaps can have various dimensions and are typically of the order of several mm depending on the specific application. The membrane assembly allows for mass and heat transfer between the chambers 18, 20. The gap between the chambers 18, 20 is shown as gap 99.

In some embodiments, the electrolyzer cell 10 comprises more than two compartments. In some embodiments, the electrolyzer cell 10 comprises a chemical compartment 17 between the anode 18 and cathode 20 chambers. In such example embodiments, two ion exchange membranes 16 may be arranged to separate the chemical compartment 17 from the anode 18 and cathode 20 chambers. The two ion exchange membranes 16 may be arranged to allow the transport of opposing charged ions. For example, the two ion exchange membranes 16 may comprise a cation exchange membrane and an anion exchange membrane. Any number of ion exchange membranes 16 and compartments, and their arrangement thereof for constructing the electrolyzer cell 10 are covered by the scope of this invention.

In some embodiments, one or more partitions 24 are arranged in at least one of the anode chamber 18 and the cathode chamber 20. The one or more partitions 24 may be aligned to divide the at least one of the chambers 18, 20 into a plurality of process stages 26 comprising a first process stage 28 and one or more subsequent process stages 30. Any number of partitions 24 may be arranged in the anode chamber 18 and/or cathode chamber 20 to result in the desired number of process stages 26. For example, the anode chamber 18 and/or cathode chamber 20 may comprise between about two process stages 26 (i.e., comprising the first process stage 28 and one subsequent process stage 30), and 20 process stages 26 (i.e., comprising the first process stage 28 and 19 subsequent process stages 30), or in some embodiments, between about five process stages 26 and 15 process stages 26. Each of the process stages 26 comprises an interstage width (W). The interstage width (W) may be constant or varied along the length of the chamber. The interstage widths of the plurality of process stages 26 within a chamber 18, 20 may be the same or different.

The plurality of process stages 26 each comprises a feed port 32 for allowing a flow of an electrolyte solution through each one of the process stages 26, from the first process stage 28 through to a final process stage 34 of the one or more subsequent process stages 30. In some embodiments, the electrolyte solution flows through each one of the plurality of process stages 26 sequentially. In some embodiments, the feed port 32 comprises a longitudinal gap 33 defined along a length (L) of the partition 24.

Figure 5:
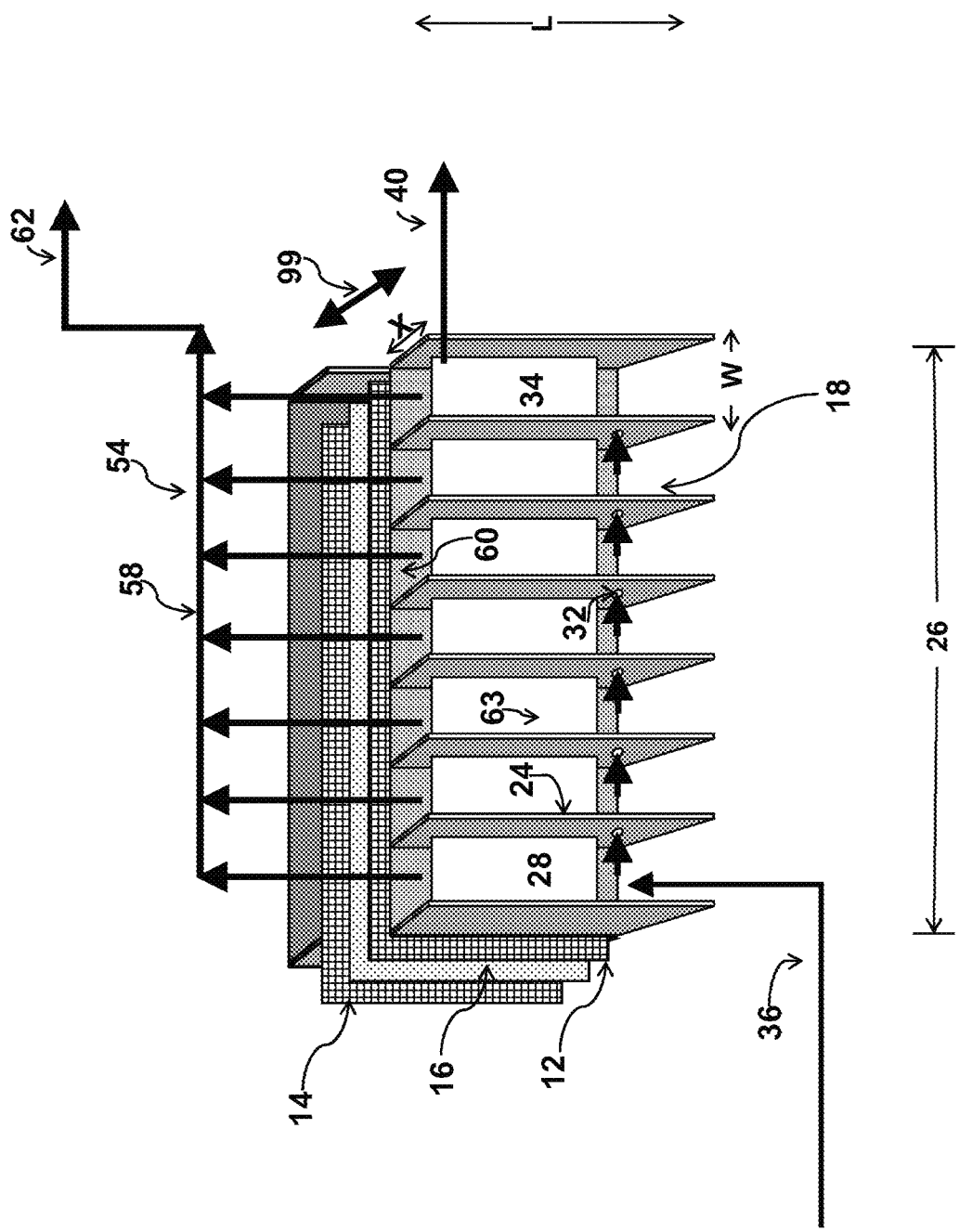
FIG. 5 is a three-dimensional schematic diagram showing some of the process flows within a chamber of the FIG. 1 multi-stage electrolytic cell.

As best illustrated in FIG. 5, in some embodiments, the one or more partitions 24 are oriented substantially perpendicular to the ion exchange membrane 16 and the electrodes (anode 12 and cathode 14). In some embodiments, each process stage 26 is exposed to the ion exchange membrane 16 and the electrodes. Each of the process stages 26 may be in contact with the ion exchange membrane 16 and the electrodes 12, 14 directly or indirectly. It will be understood to those skilled in the art that the schematics shown in the Figures are not to scale and that the orientation of the chambers 18, 20 is such that the process stages 26 in the anode chamber 18 are in contact with the ion exchange membrane 16 and anode 12 (with or without a gap between them), and that the process stages 26 in the cathode chamber 20 are in contact with the ion exchange membrane 16 and cathode 14 (with or without a gap between them). The schematics are not to-scale, since the cell thickness (X) is much smaller than the cell height (L) and stage width (W). It is also noted that the widths of the process stages 26 may be varied along the cell 10 in some embodiments.

Means may be provided to transport the electrolyte solution through each one of the plurality of process stages 26. In some embodiments, such transporting means comprises an anode fluid inlet 36 and/or a cathode fluid inlet 38 at the first process stage 28 of the respective chambers 18, 20. The anode fluid inlet 36 and/or cathode fluid inlet 38 may each be fluidly connected to a reservoir containing the electrolyte solution, such as an anolyte solution tank or a catholyte solution tank, arranged to supply the electrolyte solution into the first process stage 28 within the respective one of the anode chamber 18 and the cathode chamber 20. In some embodiments, such transporting means further comprises an anode fluid outlet 40 and/or a cathode fluid outlet 42 at the respective last process stage 34 of the chambers 18, 20. The anode fluid outlet 40 and/or a cathode fluid outlet 42 may be arranged at a first side 56 of the chamber 18, 20, or at an opposing second side 48 thereof. The first side 56 may be along a top side of the cell 10, i.e., at a side opposite to the surface on which the cell 10 is placed, and the opposing second side 48 may be along a bottom side of the cell 10, i.e., at a side being in contact with the surface on which the cell 10 is placed. The anode fluid outlet 40 and/or the cathode fluid outlet 42 are arranged to flow one of an anode product and a cathode product out of the respective chambers 18, 20. The anode product and cathode product may be extracted from the first side 56 (top) or second side 48 (bottom) of the cell 10. The fluid process flow inside the anode chamber 18 may be countercurrent or co-current to the fluid process flow inside the cathode chamber 20.

Means may be provided to separate a gas from the electrolyte solution produced in the anode chamber 18 and/or the cathode chamber 20. Such means may be provided to separate the gas from the electrolyte solution that is produced in each of the plurality of process stages 26. The gas separation means may also facilitate keeping the ion exchange membrane 16 hydrated during the course of an electrolytic process. The gas may be a gaseous product formed from an oxidation reaction or a reduction reaction at the anode 12 or cathode 14, respectively, produced and circulated with the electrolyte solution at each of the plurality of process stages 26 (in embodiments where the process stages 26 are present in the chamber 18, 20). In some embodiments, such separating means comprises a gas manifold 54. In some embodiments, the gas manifold 54 extends substantially parallel along the first side 56 of one or both of the chambers 18, 20, arranged to contact each of the process stages 26. In some embodiments, the gas manifold 54 comprises a gas conduit 58, fluidly connected to each of an interstage gas conduits 60 within each of the process stages 26. The interstage gas conduit 60 may be arranged to direct a flow of the gas that is separated from the electrolyte solution at each of the process stages 26 to the gas conduit 58. The gas conduit 58 may be fluidly connected to a gas outlet 62, 72 arranged to discharge the separated gas out of the respective chamber 18, 20.

In some embodiments, the fluid inlets 36, 38 are positioned along a second side 48 of the respective chamber 18, 20 opposite to the first side 56, or the gas manifold 54. Positioning the fluid inlets 36, 38 at a side opposite from the gas manifold 54 may assist with balancing the flow of the electrolyte solution from one process stage 26 to another. The fluid outlets 40, 42 may be located at the same side or at a side opposite from the gas manifold 54.

In some embodiments, a plate 63, such as a baffle or flow deflector, is arranged to extend within one or more of the process stages 26. The plate 63 may facilitate the circulation and 2-phase flow of the electrolyte solution within the respective one of the process stages 26 thereby, maintaining a homogenous concentration of the electrolyte solution and/or temperature across each of the process stages 26. In some embodiments, the plate 63 is oriented substantially parallel to the ion exchange membrane 16, and substantially perpendicular to the partitions 24, to create an electrolyte flow channel 64 on one side of the plate 63, and an electrolyte recycle channel 66 on the opposing side of the plate 63. In some embodiments, the electrolyte flow channel 64 is between the respective electrode 12, 14 and the plate 63, and the electrolyte recycle channel 66 is between the plate 63 and a wall of the respective chamber 18, 20. The electrolyte flow channel 64 is in fluid communication with the electrolyte recycle channel 66, thereby allowing the electrolyte solution to flow between the two channels 64, 66. The flow of the electrolyte solution in the electrolyte flow channel 64 may be in a direction opposite from the flow in the electrolyte recycle channel 66. In some embodiments, the electrolyte solution containing the gas is caused to flow towards the gas manifold 54 in the electrolyte flow channel 64 for separation of the gas from the electrolyte solution.

In some embodiments, the feed port 32 on the partition 24 is positioned to face towards the electrolyte recycle channel 66, opposite the electrolyte flow channel 64. The feed port 32 may be arranged proximal to the second end 48 of the chamber 18, 20. The feed port 32 is arranged to cause a flow of the electrolyte from one process stage 26 to the adjacent one of the process stage 26 after the electrolyte solution has circulated through both the electrolyte flow channel 64 and the electrolyte recycle channel 66 within the one process stage 26. In such embodiments, the electrolyte solution comprising substantially the gas-separated electrolyte solution is caused to flow into the adjacent one of the process stage 26.

In some embodiments, opposing first and second ends 25, 27 of the one or more partitions 24 are sealed to the walls of the chamber 18, 20. The feed port 32 is positioned at a point along the partition 24 between the first and second ends 25, 27. In some embodiments, substantially all of the electrolyte solution is transported through the feed port 32.

Figure 4:
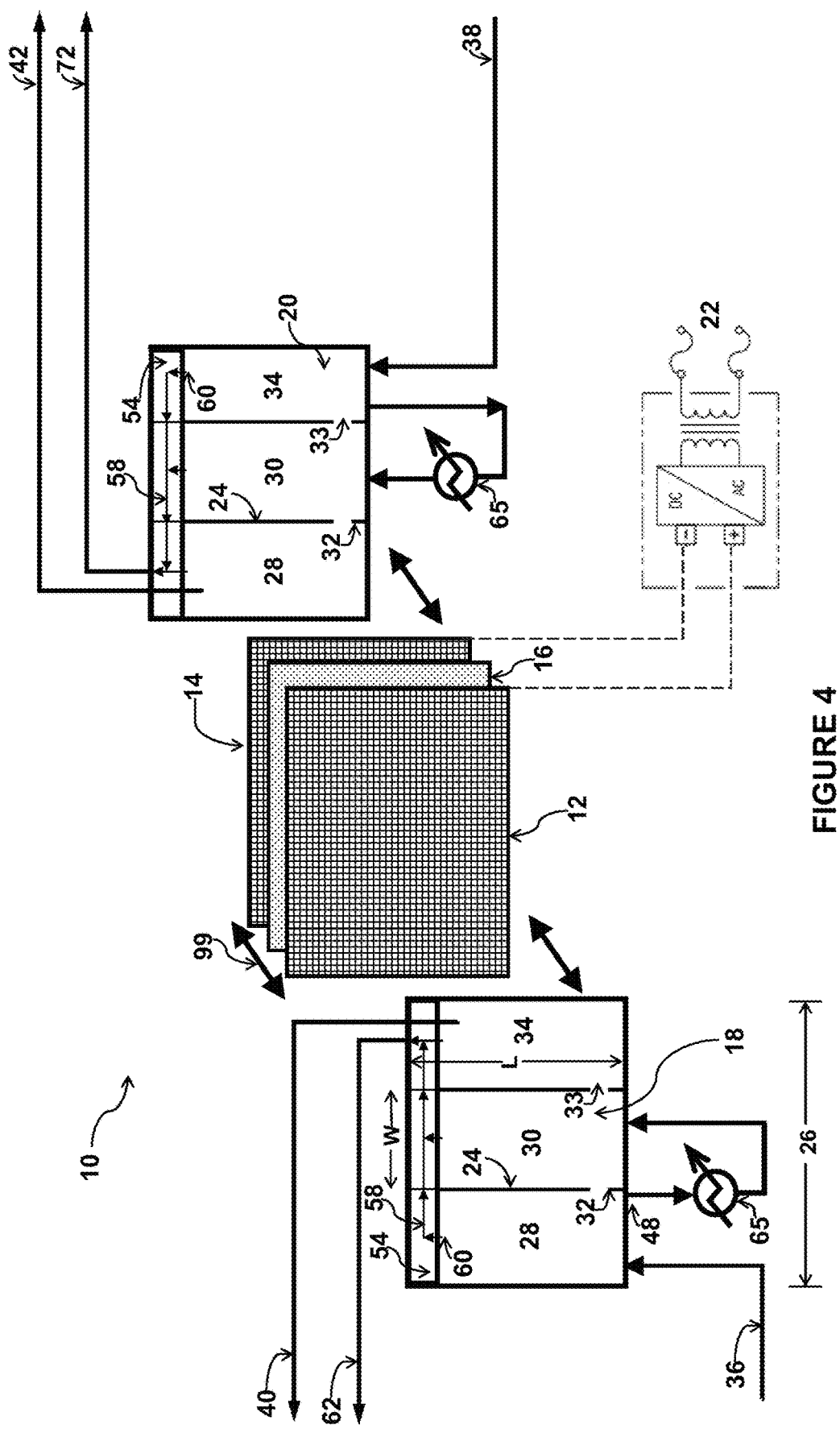
FIG. 4 is a schematic diagram of a multi-stage electrolytic cell according to a fourth example embodiment of this invention. This example embodiment illustrates in-situ cooling of electrolyte solution.

In some embodiments, as shown in FIG. 4, an internal or external electrolyte cooler 65 is fluidly connected to two process stages 26, arranged to cool the electrolyte solution as the electrolyte solution is transported from one process stage 26 to a subsequent process stage 26. In some embodiments, the electrolyte cooler 65 is fluidly connected to two adjacent process stages 26. In embodiments in which the anode and/or cathode chambers 18, 20 comprises more than two process stages 26, a plurality of electrolyte coolers 65 may be arranged to cool the electrolyte solution as the electrolyte solution is transported through different process stages 26. The electrolyte coolers 65 may be arranged internally or externally to the electrolyzer cell 10.

Figure 2:
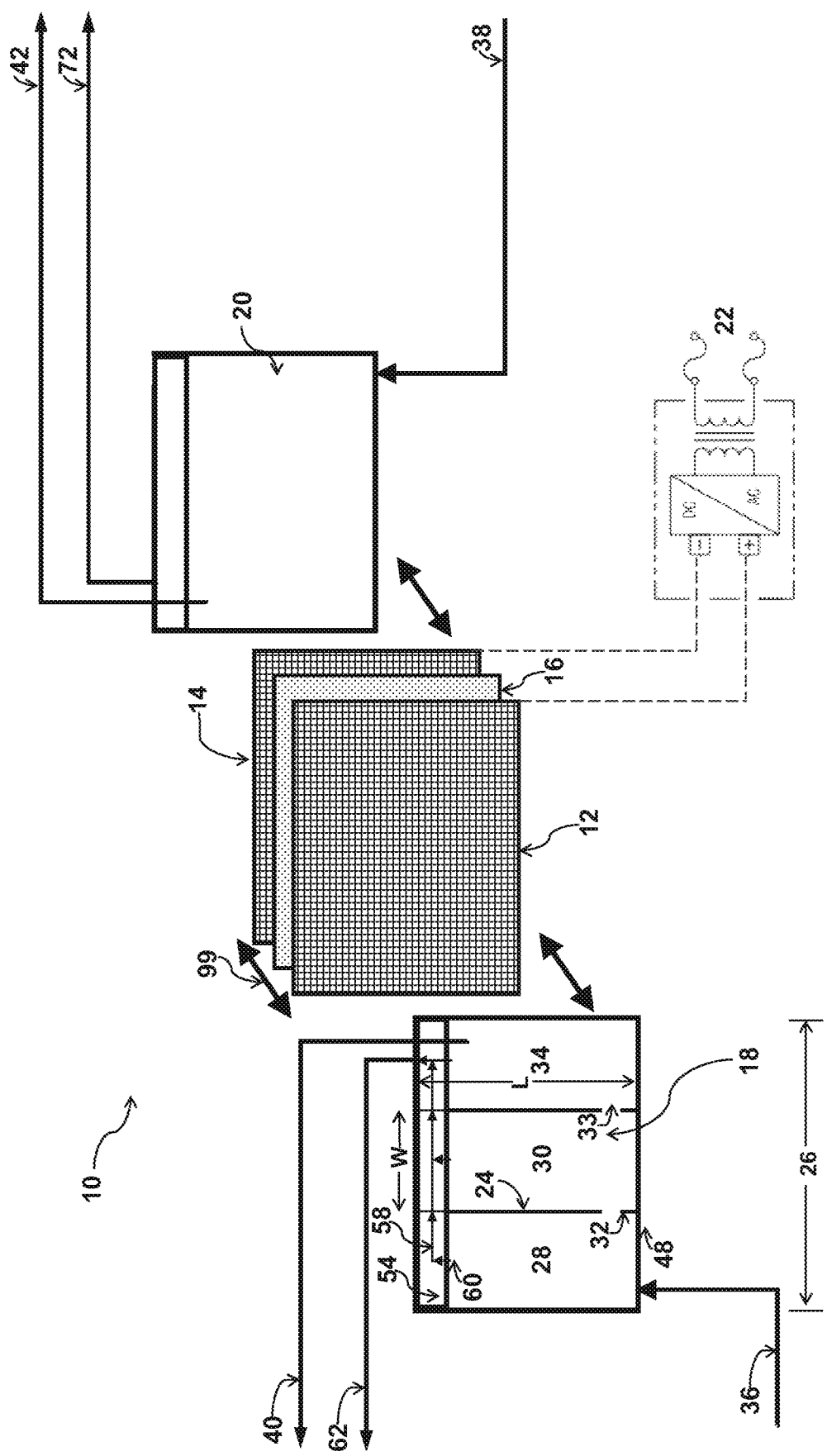
FIG. 2 is a schematic diagram of a multi-stage electrolytic cell according to a second example embodiment of this invention. This example embodiment illustrates a multi-stage anode chamber and a single-stage cathode chamber.
Figure 3:
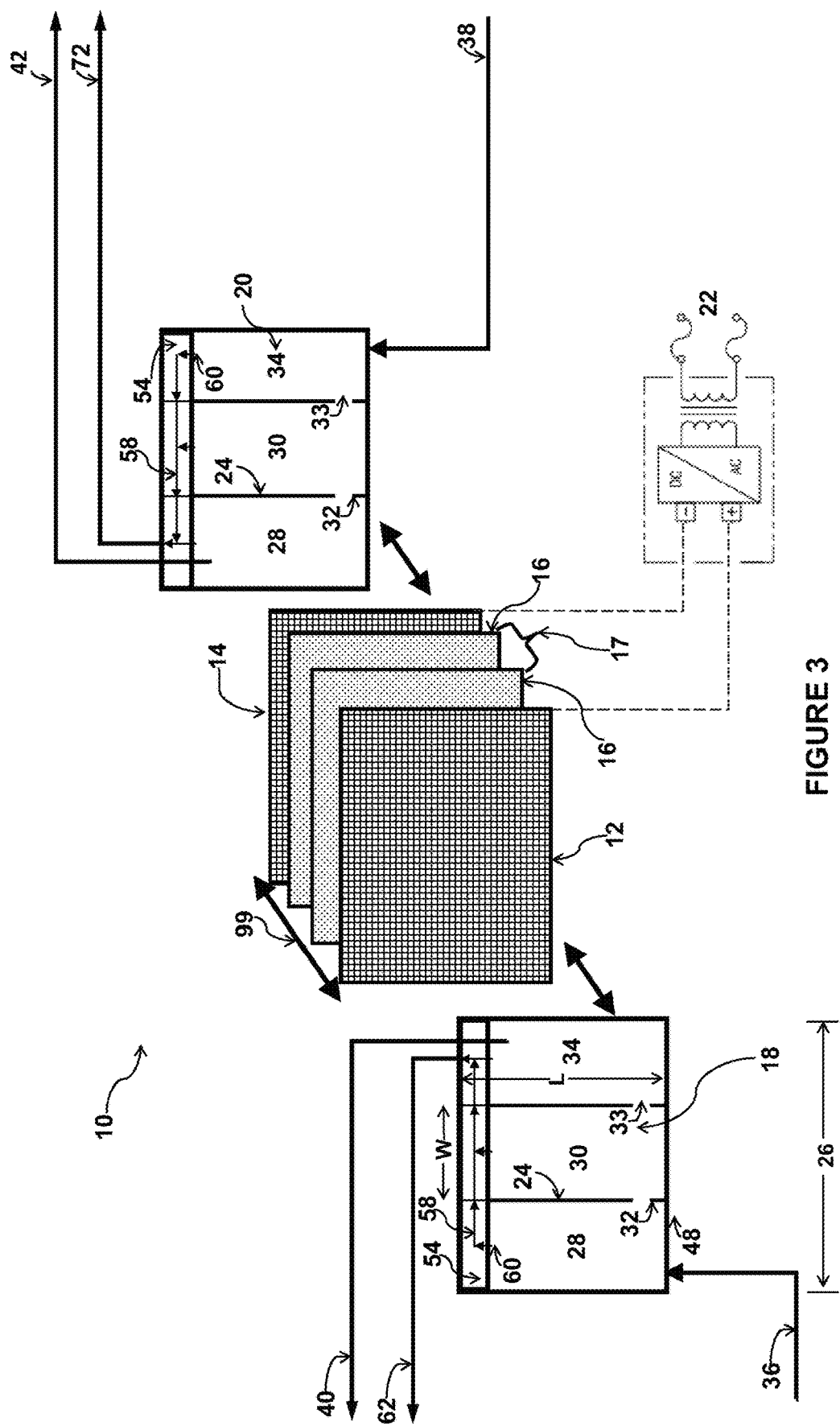
FIG. 3 is a schematic diagram of a multi-stage electrolytic cell according to a third example embodiment of this invention. This example embodiment illustrates a three-compartment cell.

FIGS. 1-12 illustrate different embodiments the electrolyzer cell 10 of the present invention. In some embodiments, as illustrated in FIG. 2, the electrolyzer cell 10 comprises one or more partitions 24 arranged in the anode chamber 18 to provide a plurality of process stages 26 in the anode chamber 18, but such partitions 24 are not arranged in the cathode chamber 20. In such embodiments, the electrolytic process which occurs in the cathode chamber 20 is referred to as a "single-stage process", which is in contrast to a "multi-stage process" that occurs in the anode chamber 18.

As used herein, a "single-stage process" refers to an electrolytic process in which the electrolyte solution is supplied and mixed within a single chamber or compartment. In a single-stage process, the electrolyte solution may not be caused to transport in a horizontal convective flow or horizontal forced convective flow between compartments so as to produce a horizontal velocity of electrolyte sequentially flowing between adjacent compartments. "Horizontal convective flow" or "horizontal forced convective flow" refers to the movement of fluid electrolyte that is driven by a pressure gradient caused by the liquid pump loop. This pressure gradient ensures that the liquid electrolyte is forced horizontally through the chamber from a higher-pressure inlet process stage to a lower pressure outlet process stage. "Horizontal" means in a direction parallel to the plane of a bottom surface of the chamber or compartment, i.e., a surface on which the chamber or compartment lies. With reference to FIG. 1, "horizontal" is the direction parallel to the plane of the second side 48 of the cell 10. A "single compartment" may refer to an anode or cathode chamber or compartment as a single unit. Alternatively, a "single compartment" may refer to each section, such as each divided section, within the anode or cathode chamber.

One or more of the below features may be observed or found in a chamber operating a "single-stage process":
- a substantially homogenous profile of pressure in the horizontal direction of the process chamber; and/or
- a substantially homogeneous profile of species concentrations for reactants and/or products in the horizontal direction of the process chamber; and/or
- a liquid electrolyte distributor may be used to feed electrolyte homogeneously to various horizontal positions of the process chamber; and/or
- the process performance (e.g., current efficiency and/or electrolyte conversion, etc.) would be similar to a single-stage "well-mixed" unit.

One or more of the below features may be observed or found in a chamber operating a "multi-stage process":
- a decrease in liquid electrolyte pressure profile in the horizontal direction of the process chamber (i.e., the liquid pressure in process stage N is higher than the liquid pressure in process stage N+1); and/or
- a decrease in reactant species concentration in the horizontal direction of the process chamber (i.e., the concentration of the reactant in process stage N is higher than the concentration of the reactant in process stage N+1); and/or
- an increase in product species concentration in the horizontal direction of the process chamber (i.e., the concentration of the product in process stage N+1 is higher than the concentration of the product in process stage N).

In some embodiments, as illustrated in FIG. 1, the electrolyzer cell 10 comprises one or more partitions 24 arranged in both the anode chamber 18 and the cathode chamber 20 such that the electrolytic processes that occur in both of the chambers 18, 20 are in multi-stages. In other example embodiments, the electrolyzer cell 10 comprises one or more partitions 24 arranged in the cathode chamber 20, and not the anode chamber 18, such that the electrolytic process in the anode chamber 18 occurs in a single-stage, while the process in the cathode chamber 20 occurs in multi-stages.

The electrolyzer cell 10 may be operated as a single cell. In some embodiments, a plurality of electrolyzer cells 10 may be arranged to form an electrolytic cell stack to achieve full scale commercial industrial production rates.

Aspects of the invention pertain to using the electrolyzer cell 10 to perform a multi-stage electrolytic method. The electrolyzer cell 10 may be used to perform any method which involves redox chemical reactions. The multi-stage electrolytic method comprises the steps of applying an electrical potential between an anode and a cathode, supplying an anolyte solution into an anode chamber within which the anode is exposed, supplying a catholyte solution into a cathode chamber within which the cathode is exposed, oxidizing at the anode, an anode reactant contained in the anolyte solution to form an oxidation product, and reducing, at the cathode, a cathode reactant contained in the catholyte solution to form a reduction product. In one or both of the anode chamber and the cathode chamber, the respective one of the anolyte solution and/or the catholyte solution is supplied to a first process stage. Within the first process stage, the anode reactant or the cathode reactant undergoes the respective oxidation or reduction reaction. The electrolyte solution (i.e., anolyte or catholyte solution) comprising the respective anode product and cathode product such as one or more ions and gas may be circulated within the first process stage. In some embodiments, within the first process stage, the gas is separated from the electrolyte solution. The ions may be transported into the other one of the anode chamber and cathode chamber by permeating through an ion exchange membrane separating the anode and cathode chambers. The gas-separated electrolyte solution may be transported into a subsequent process stage through a feed port arranged at a partition separating the process stages.

Within a subsequent process stage, the gas-separated electrolyte solution containing the anode reactant or the cathode reactant undergoes the respective oxidation or reduction reaction. The electrolyte solution comprising the respective anode product and cathode product such as one or more ions and gas may be circulated within the subsequent process stage. In some embodiments, within the subsequent process stage, the gas is separated from the electrolyte solution. The ions may be transported into the other one of the anode chamber and cathode chamber by permeating through the ion exchange membrane. The further gas-separated electrolyte solution may be transported into an adjacent one of a further subsequent process stage through the feed port.

The further gas-separated electrolyte solution is transported sequentially through each one of the one or more subsequent process stages until the electrolyte solution reaches the last one of the subsequent process stages.

Within the last one of the subsequent process stages, the further gas-separated electrolyte solution containing the anode reactant or the cathode reactant undergoes the respective oxidation or reduction reaction. The electrolyte solution comprising the respective anode product and cathode product such as one or more ions and gas may be circulated within the last one of the subsequent process stage. In some embodiments, within the last one of the subsequent process stage, the gas is separated from the electrolyte solution. The ions may be transported into the other one of the anode chamber and cathode chamber by permeating through the ion exchange membrane. The further gas-separated electrolyte solution may be depleted (fully or partially). The fully or partially further gas-separated electrolyte solution may be caused to flow out of the last one of the subsequent process stages. The fully or partially further gas-separated electrolyte solution may comprise the respective anode product and cathode product.

In some embodiments, the anolyte solution and/or the catholyte solution comprises one or more compounds in addition to the respective anode reactant and cathode reactant. The one or more compounds may undergo a chemical reaction and/or a redox reaction (i.e, an oxidation or reduction reaction at the anode and cathode respectively). The one or more compounds may alternatively be supplied into the anode or cathode chambers separate from or previously mixed with the anolyte solution and/or catholyte solution.

In some embodiments of the method, gas is separated from the anolyte solution or the catholyte solution at each one of the process stages. The gas may be a gaseous product produced from the oxidizing step, or the reducing step. The anolyte solution and/or the catholyte solution may contain the respective gaseous products. The gas may be separated at a gas manifold exposed within each of the process stages. The separated gas may then be caused to flow into a gas conduit towards a gas outlet for discharge out of the respective one of the anode and cathode chambers. In some embodiments, one or more liquid products generated at the anode and/or cathode are discharged from a fluid outlet arranged at the last one of the subsequent process stages. In some embodiments, the gas and liquid products generated at the anode and/or cathode are arranged to flow out of the electrolyzer cell through different outlets.

Figure 6:
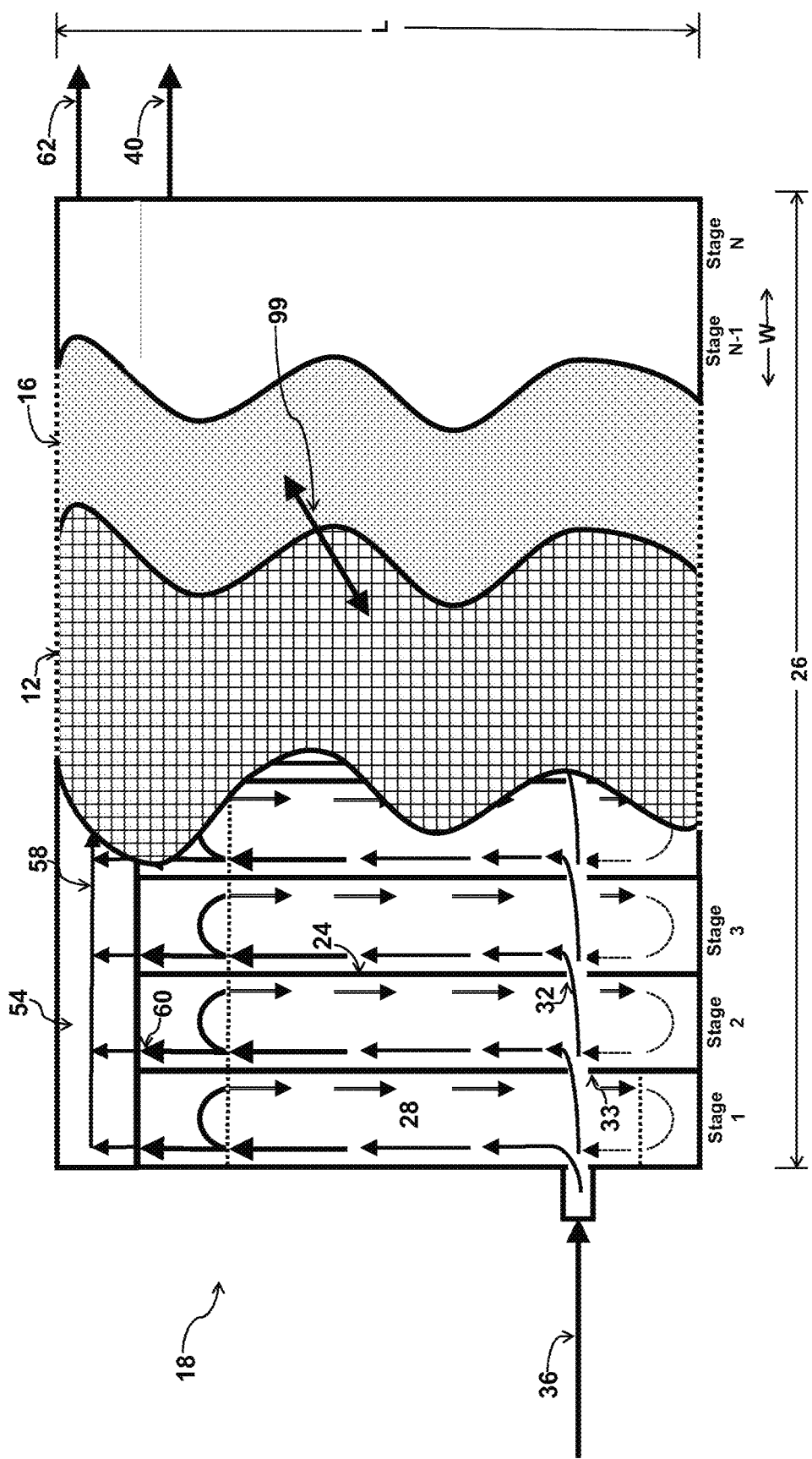
FIG. 6 is a schematic diagram showing a cross-sectional view of an undefined (N) number of process stages within a chamber of the FIG. 1 multi-stage electrolytic cell. The background shaded areas indicate the electrode and membrane assembly.
Figure 7:
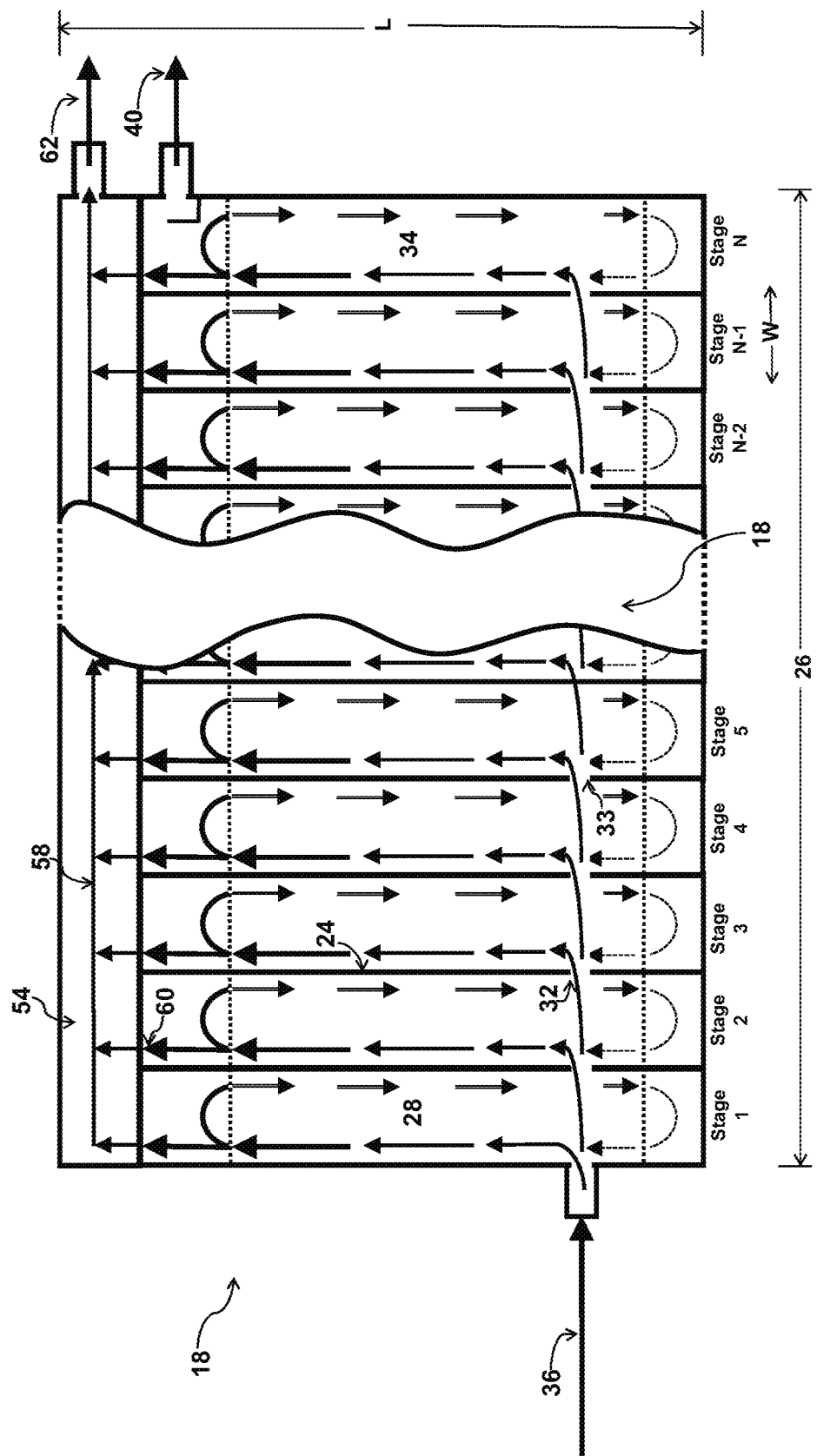
FIG. 7 is a schematic diagram showing a cross-sectional view of the N process stages within a chamber of the FIG. 1 multi-stage electrolytic cell. The arrows show an example fluid circulation of electrolyte solution within each process stage, and between process stages.
Figure 8:
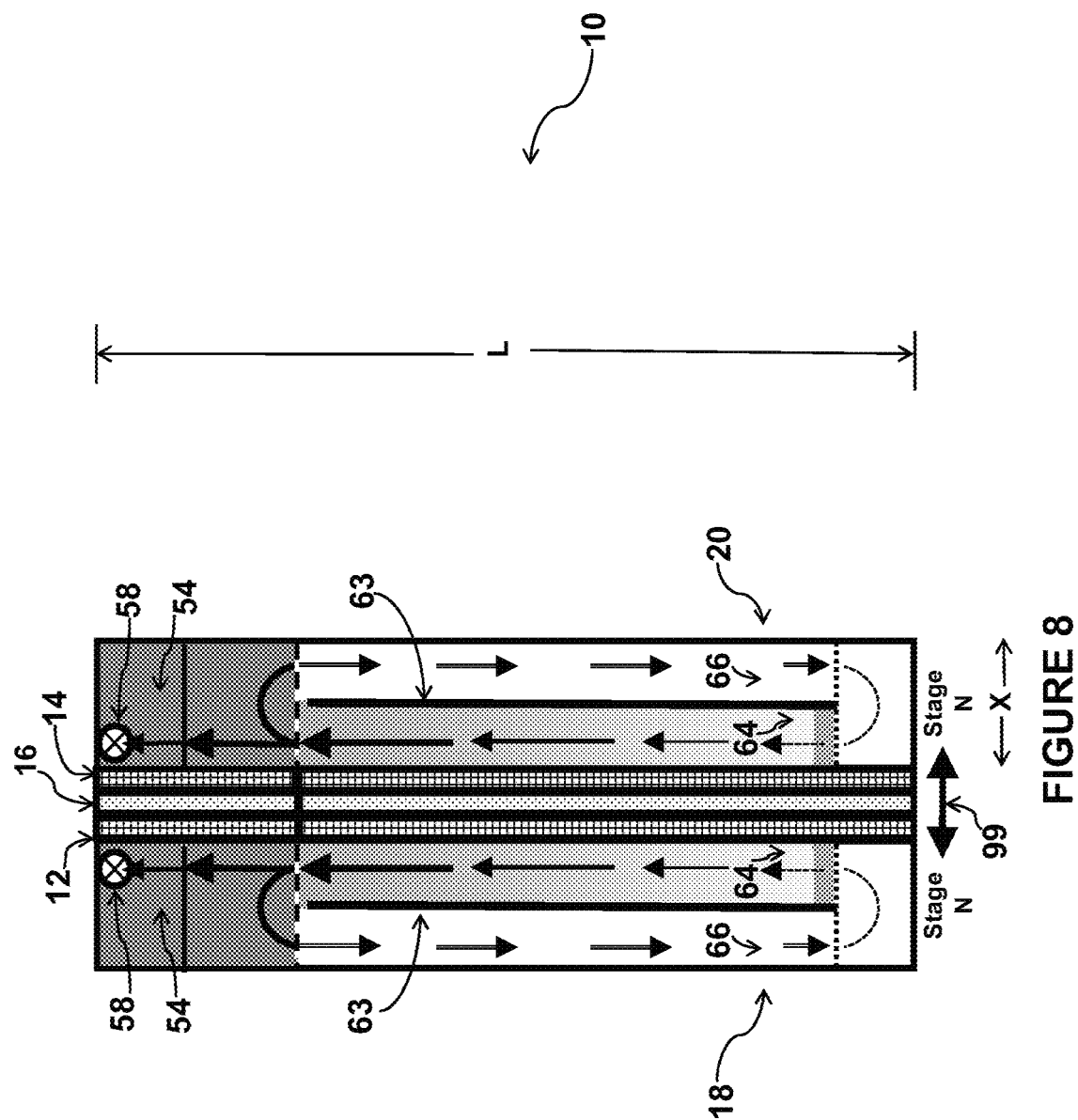
FIG. 8 is a schematic diagram showing a cross-sectional view of one process stage within the chambers of the FIG. 1 multi-stage electrolytic cell. The arrows show the direction of flow of the electrolyte within the process stage according to an example embodiment.

FIGS. 6 to 8 are schematic representations of a multi-stage cell compartment comprising an $N^{th}$ number of process stages, each having a thickness (X), a height (L) and a stage width (W). The process stages in the chamber are in direct contact with the ion exchange membrane and electrode (with or without a gap between them).

Referring to FIGS. 6 to 8, in some embodiments, the transporting of the anolyte solution and/or catholyte solution through a plurality of process stages comprises circulating the solution between opposing sides of a plate or baffle which extends within the process stage. In some embodiments, the solution is caused to circulate, within each process stage, between an electrolyte flow channel and an electrolyte recycle channel in opposite flow directions. In some embodiments, the solution may flow, in the electrolyte flow channel, towards the direction of the gas manifold for separation of the gas from the solution. The gas-separated solution may then flow, in the electrolyte recycle channel, in a direction opposite to the gas manifold or gas outlet. In some embodiments, at least some of the gas-separated solution is circulated to the electrolyte flow channel for re-use, and at least some of the gas-separated solution is transported to an adjacent one of the process stage.

The electrolytic method may be a continuous process, in which reactants are continuously supplied into the system and/or products are continuously produced and removed therefrom, without stopping the process. The continuous electrolytic method of the present invention may allow for maintaining the temperature and/or concentration profiles on the surfaces of the ion exchange membrane substantially constant over time, or allows for reducing the time-variation of the temperature and/or concentration thereon, thereby improving the longevity and/or the performance of the membrane.

In some embodiments, the electrolytic method is operated at a temperature in the range of from about 1° C. to about 100° C., or in some embodiments, in the range of from about 30° C. to about 95° C., or in some embodiments, in the range of from about 50° C. to about 90° C.

In some embodiments, the electrolytic method is operated at a current density of up to about 10,000 A m$^{-2}$, or in some embodiments, between about 1,000 A m$^{-2}$ and about 6,000 A m$^{-2}$, or in some embodiments, between about 1,000 A m$^{-2}$ and about 4,000 A m$^{-2}$, or in some embodiments, between about 2,000 A m$^{-2}$ and about 4,000 A m$^{-2}$. The applied electrical potential of less than 30 V, or in some embodiments between 1 and 10 Volts, or in some embodiments between 2 and 6 Volts.

In some embodiments, the concentration of anolyte solution and/or catholyte solution being supplied to the respective anode chamber and cathode chamber is in the range of about 0.1 M to about 10 M, or in the range of from about 0.5 M to about 7 M in some embodiments. In embodiments in which the anolyte solution and/or catholyte solution comprises a salt, the concentration of the solution is at a solubility limit of the salt, or less than the solubility limit of the salt.

Operating a multi-stage electrolytic method of the present invention advantageously results in greater current efficiency and/or greater electrolyte conversion and/or reduced electrolyte liquid flow, as compared to operating a single-stage electrolytic method.

The electrolytic method of the present invention may be operated at a current efficiency of up to about 90%, or in some embodiments, between about 40% and about 90%, or in some embodiments, between about 50% and about 80%. As used herein, "current efficiency" refers to the proportion of the electrons delivered to or removed from an electrode that yield a desired product. Current efficiency measures the percentage of current that is used to produce the desired product and not wasted in producing unwanted side reactions or generating heat. A high current efficiency indicates that the electrolytic cell is operating efficiently and effectively, while a low current efficiency indicates that there is a large amount of energy wasted or unwanted side reactions occurring.

The electrolytic method of the present invention may be operated at an electrolyte conversion of up to about 90%, or in some embodiments, between about 20% and about 90%, or in some embodiments, between about 60% and about 80%. As used herein, "electrolyte conversion" refers to the proportion of starting material contained in the electrolyte that has converted into a desired product. In some example embodiments, the starting material contained in the electrolyte is a salt, and "electrolyte conversion" as used herein refers to the proportion of the salt that has converted into a desired base product. The electrolyte conversion is estimated as a per-pass conversion.

A low liquid flow allows for simplification of the overall plant design, reduction of pump size, piping diameter, and pumping costs as compared to conventional electrolyzer cells which operate a single-stage process. In the present invention, each pass of the liquid electrolyte achieves much greater conversion, and depletion, advantageously reducing and potentially eliminating the need to recirculate electrolyte from an external storage tank loop. Since liquid recirculation can be eliminated, there is a reduction in the total hydraulic pumping requirements of the cell operation.

In some embodiments, the transport of the electrolyte solution sequentially from one process stage to an adjacent process stage comprises horizontal forced convective flowing of the electrolyte solution across the process stages. In some embodiments, the horizontal forced convective flow of the electrolyte solution sequentially from one process stage to an adjacent process stage produces a horizontal velocity of the electrolyte solution across the process stages.

In some embodiments, the electrolyte solution becomes further converted as it is caused to be transported from one process stage to an adjacent process stage such that the concentration of the reactant or starting material contained in the electrolyte solution decreases as the electrolyte solution is transported from one process stage to an adjacent one of the subsequent process stages. In some embodiments, the concentration of the reactant in the first process stage is greater than the concentrations of the reactant in any one of the subsequent process stages. In some embodiments, the concentration of the reactant in the final process stage is less than the concentrations of the reactant in any one of the preceding process stages.

The above provides some example operating conditions that may be favorable in the operating of the electrolytic method. The electrolytic method may however be tuned to optimize one or more of product selectivity, current efficiency and reaction rate of each of the electrochemical reactions and chemical reactions by adjusting one or more of the following non-limiting example of operating conditions:
  operating conditions of the cell such as temperature, pH, and pressure; and/or
  flow rate and/or composition of the reactants and/or catholyte solution and/or anolyte solution; and/or
  characteristics of the ion exchange membrane such as the thickness, porosity, material, chemical composition, and method of manufacture; and/or
  electrical operating conditions such as the applied electrical potential and current; and/or.
  characteristics of the cathode and/or anode electrodes such as the material, geometry and method of fabrication; and/or
  geometry of the cell, including dimensions of each stage, baffle configuration and key dimensions; and/or
  distance between parallel equipment such as the cell walls, anode, membrane and cathode, as well as the gap between them; and/or
  nature of the cathode and/or anode catalyst.

One non-limiting example of application of the electrolyzer cell 10 and the electrolytic method is in salt splitting, or the process of decomposing a salt. In some embodiments, the decomposing of the salt reduces the concentration of the salt and produces a desired base product.

Figure 9:
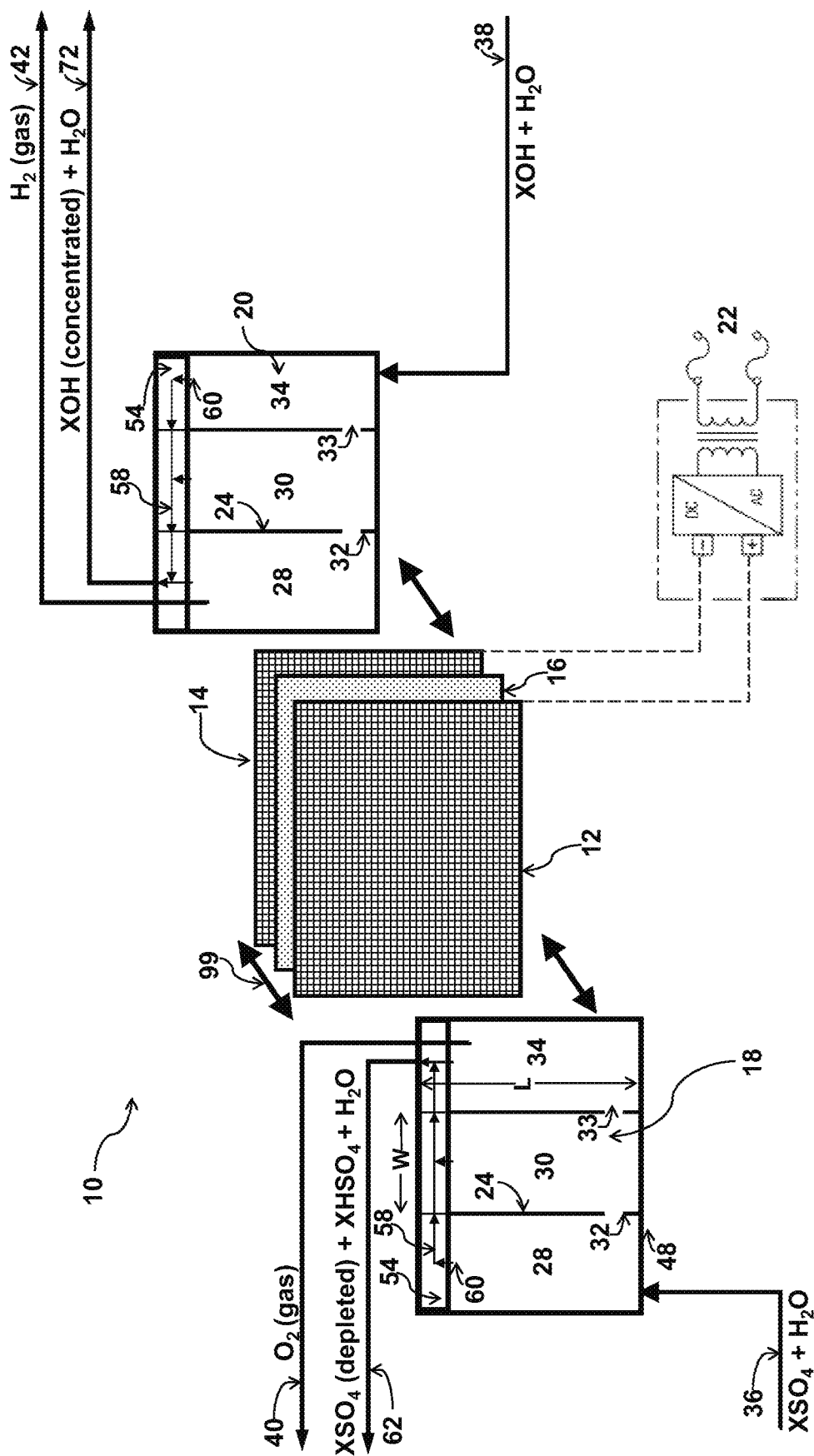
FIG. 9 is a schematic diagram of a multi-stage electrolyzer cell showing reactions that may occur in each of the chambers of the electrolyzer cell according to an example embodiment.
Figure 10:
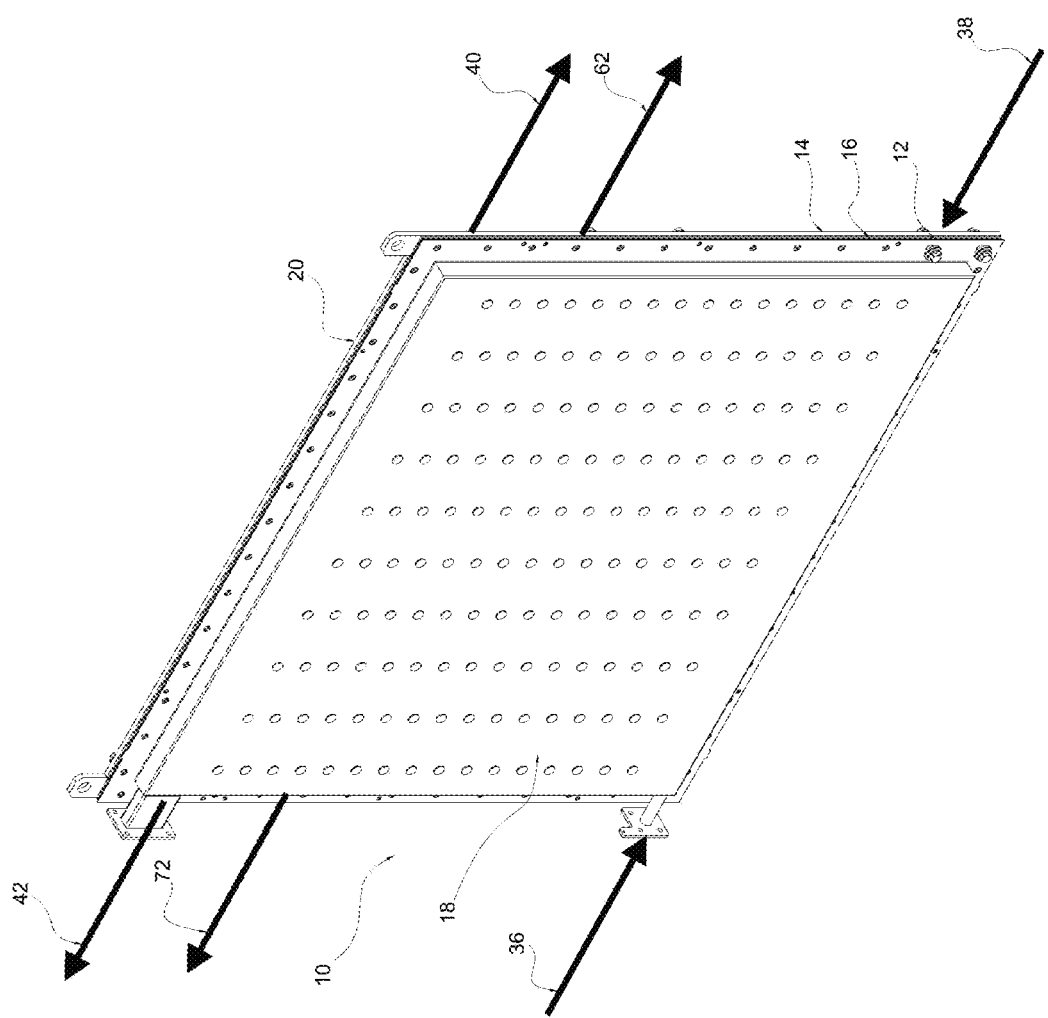
FIG. 10 is a three dimensional model of a single full-size cell showing the process flows entering and leaving each cell compartment.

FIG. 9 is a schematic diagram of an electrolyzer cell 10 showing reactions that may occur in each of the chambers 18, 20 of the cell 10 according to an example embodiment. In some example embodiments, the anolyte solution comprises a salt for splitting or decomposing. The salt may in some examples comprise a Group 1 metal sulfate salt ($XSO_4$), such as lithium sulphate ($Li_2SO_4$), sodium sulphate ($Na_2SO_4$), potassium sulphate ($K_2SO_4$), rubidium sulphate ($Rb_2SO_4$), and cesium sulphate ($Cs_2SO_4$). In some embodiments, the catholyte solution comprises a base (XOH). The base may comprise a hydroxide ($OH^-$) including alkali hydroxides such as lithium hydroxide (LiOH), sodium hydroxide (NaOH), potassium hydroxide (KOH), rubidium hydroxide (RbOH), and cesium sulphate (CsOH). Other chemistries that benefit from a multi-stage method of electrolysis can also be used in the present invention. It is noted that treating the species above may have application in the processing of fresh feedstocks as well as for re-processing and recycling of minerals, such as is the case for battery recycling applications.

In some embodiments, an anode reactant and/or the cathode reactant is contained in the respective anolyte solution and catholyte solution. The anode reactant and/or cathode reactant may comprise water ($H_2O$).

In the FIG. 9 example embodiment, the anolyte solution containing the salt and the water is supplied to the first process stage 28 of the anode chamber 18 through the anode fluid inlet 36, within which the water ($H_2O$) may undergo an oxidation reaction at the anode 12 to produce oxygen gas ($O_2$) and hydrogen ions ($H^+$) as the oxidation products. Within the first process stage 28, the salt may, in the presence of water, dissociate into its ion counterparts. In the illustrated embodiments, the salt comprises a metal sulfate salt ($XSO_4$), which may chemically dissociate into cations (e.g., $X^+$) and anions ($SO_4^{2-}$). The anolyte solution, carrying the oxidation products, may flow towards the gas manifold 54 in the first process stage 28 within which the gas ($O_2$) is separated from the anolyte solution. The gas ($O_2$) may then flow into the gas conduit 58 towards the gas outlet 62 for discharge out of the anode chamber 18. At least some of the gas-separated anolyte solution may be transported to an adjacent one of the subsequent process stage 30 through the feed port 32. The gas-separated anolyte solution may comprise one or more of water, salt, cations, anions, and oxidation products. The gas-separated anolyte solution may comprise at least some gas. Within the adjacent one of the subsequent process stages 30, the water ($H_2O$) contained in the gas-separated anolyte solution that is transported from the first process stage 28 may undergo an oxidation reaction at the anode 12 to produce oxygen gas ($O_2$) and hydrogen ions ($H^+$). The salt contained in the gas-separated anolyte solution (if present) may chemically dissociate into cations and anions. The gas-separated anolyte solution, carrying the oxidation products, may flow towards the gas manifold 54 in the adjacent one of the subsequent process stage 30 within which the gas ($O_2$) is separated from the gas-separated anolyte solution. The gas ($O_2$) may then flow into the gas conduit 58 towards the gas outlet 62 for discharge out of the anode chamber 18. At least some of the further gas-separated anolyte solution may be transported to another adjacent one of the subsequent process stage 30, and the process and reactions repeat within each of the subsequent process stages 30 until the gas-separated electrolyte solution is at the final one of the subsequent process stage 34 wherein which the anode products are discharged out of the anode fluid outlet 40. The anode products may comprise a salt product. In the example embodiment, the salt product comprises metal sulfate salt ($XSO_4$) and metal hydrogen bisulphate ($XHSO_4^-$). The concentration of the salt product is preferably less than the concentration of the feed salt in the anolyte solution.

In the illustrated embodiments, the cations ($X^+$) that are dissociated from the salt ($XSO_4$) in the anode chamber 18 within each of the process stages 28, 30 are transported through the ion exchange membrane 16 towards the cathode chamber 20.

The catholyte solution containing the base and the water is supplied into the first process stage 28 of the cathode chamber 20 through the cathode fluid inlet 38, within which the water ($H_2O$) may undergo a reduction reaction at the cathode 14 to produce hydrogen gas ($H_2$) and hydroxide ions (OH) as the reduction products. The base may, in the presence of water, dissociate into its ion counterparts. In the illustrated embodiments, the base comprises hydroxide ions (XOH), which may chemically dissociate into cations ($X^+$) and anions (OH). The catholyte solution, carrying the reduction products, may flow towards the gas manifold 54 in the first process stage 28 within which the gas ($H_2$) is separated from the catholyte solution. The gas ($H_2$) may then flow into the gas conduit 58 towards the gas outlet for discharge out of the cathode chamber 20. At least some of the gas-separated catholyte solution may be transported to an adjacent one of the subsequent process stage 30 through the feed port 32. The gas-separated catholyte solution may comprise one or more of water, base, cations, anions, and reduction products. The gas-separated catholyte solution may or may not comprise at least some gas. Within the adjacent one of the subsequent process stages 30, the water ($H_2O$) contained in the gas-separated catholyte solution that is transported from the first process stage 28 may undergo a reduction reaction at the cathode to produce hydrogen gas ($H_2$) and hydroxide ions (OH). The base contained in the gas-separated catholyte solution (if present) may chemically dissociate into cations and anions. The gas-separated catholyte solution, carrying the reduction products, may flow towards the gas manifold 54 within the adjacent one of the subsequent process stage 30 within which the gas ($H_2$) is separated from the gas-separated catholyte solution. The gas ($H_2$) may then flow into the gas conduit 58 towards the gas outlet for discharge out of the cathode chamber 20. At least some of the further gas-separated catholyte solution may be transported into another adjacent one of the subsequent process stage 30, and the process and reactions repeat within each of the subsequent process stages 30 until the gas-separated catholyte solution is at the final one of the subsequent process stage 34 wherein which the cathode products are discharged out of the cathode fluid outlet 42.

The cation (e.g., $X^+$) that is transported through the ion exchange membrane 16 from the anode chamber 18 may react with the anions present in the cathode chamber 14.

In some embodiments, the cations (e.g., $X^+$) react with the anions (e.g., $OH^-$) produced from the reduction reaction and/or the anions dissociated from the base contained in the catholyte solution.

The cathode products may comprise a base product. In the example embodiment, the base product comprises a solution containing hydroxide ions ($OH^-$). The concentration of the base product is preferably greater than the concentration of the base contained in the catholyte solution.

EXAMPLES

An multi-stage electrolyzer cell of the type as schematically illustrated in FIG. 2, and the electrolytic method described herein were used to decompose $Na_2SO_4$. Ten partitions 24 were arranged within the anode chamber 18, thereby the anode chamber 18 comprises 11 process stages 26. No partitions 24 were arranged within the cathode chamber 20. The anode chamber 18 was a multi-stage compartment while the cathode chamber 20 was a conventional single-stage compartment. The anolyte solution comprises a $Na_2SO_4$ at a concentration between 1 M and 6 M (Molar) and water ($H_2O$) as the anode reactant. The catholyte solution comprises NaOH and water ($H_2O$) as the cathode reactant. A cation exchange membrane 16 separates the anode chamber 18 from the cathode chamber 20. A single-stage electrolyzer cell without any partitions arranged in the anode chamber or cathode chamber, is used as a control.

Tests were run using a full-size cell of about 1.5 $m^2$ at around 30 to 60° C., with current density of around 3,000 to 5,000 A $m^{-2}$, and a voltage of about 3.5 to 5.5 Volts.

Figure 11:
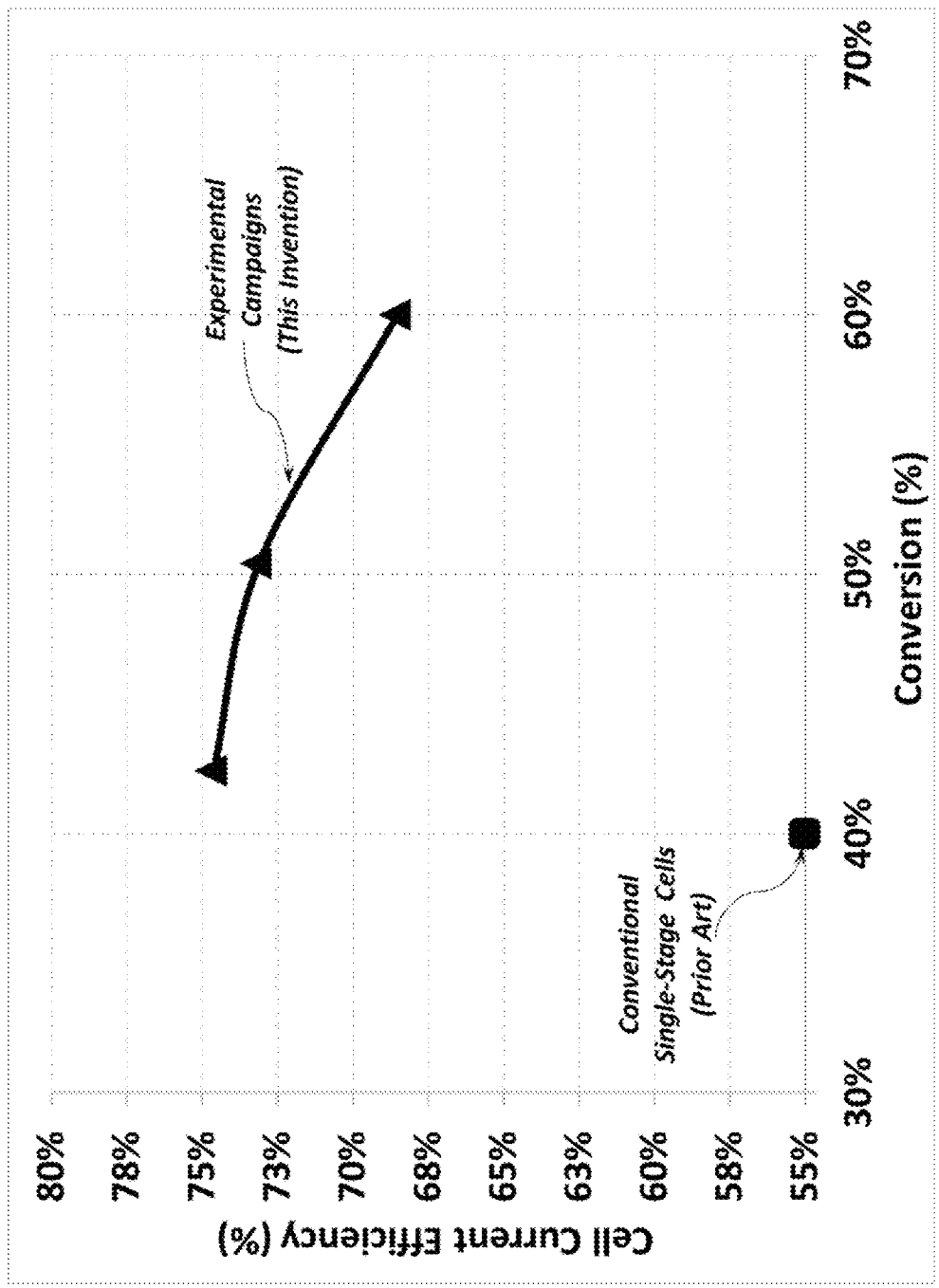
FIG. 11 is a plot of the current efficiency (%) as a function of electrolyte conversion (%) to perform a salt splitting process, comparing the performance of a multi-stage electrolyzer cell of FIG. 2 to a conventional single-stage cell. All data was measured in pilot plant trials performed with a full-size cell.

FIG. 11 is a plot of current efficiency (%) as a function of electrolyte conversion (%) during various campaigns of electrolysis in a pilot plant test. The plant was operated until steady-state was reached for a variety of feed conditions and cell parameters, and FIG. 11 provides an example of the performance achieved. The triangle data points show steady-state performance for the multi-stage electrolyzer as measured in the pilot plant, while the square data point provides the control performance as measured in a single-stage cell.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

The invention claimed is:

1. An electrolyzer cell comprising:
an anode chamber;
an anode exposed in the anode chamber;
a cathode chamber;
a cathode exposed in the cathode chamber;
at least one ion exchange membrane separating the anode chamber and the cathode chamber;
one or more partitions in at least one of the anode chamber or the cathode chamber, dividing the at least one of the chambers into a plurality of process stages comprising a first process stage and one or more subsequent process stages, wherein opposing first and second ends of each one of the one or more partitions, the first and second ends being opposing terminal ends of the partition, are sealed to respective first and second walls of the respective anode and cathode chambers, thereby preventing a flow of fluid between the terminal ends of each one of the partitions and the respective first and second walls of the anode and cathode chambers;
a gas separation means exposed in each of the plurality of process stages arranged to separate a gas from an electrolyte solution to produce a gas-separated electrolyte;
a gas outlet fluidly connected to the gas separation means for discharging the gas separated from the electrolyte solution;
a feed port positioned at a point along a respective one of the one or more partitions between the first and second ends thereof through which the gas-separated electrolyte solution flows from a preceding one of the process stages to an adjacent one of the one or more subsequent process stages, wherein the gas-separated electrolyte solution flows sequentially through each one of the process stages through the respective feed ports, from the first process stage through to a final one of the one or more subsequent process stages;

a fluid inlet at the first process stage arranged for supplying the electrolyte solution into the first process stage;
a fluid outlet at the final one of the one or more subsequent process stages arranged for discharging the gas-separated electrolyte solution; and
means for connecting a power source to apply an electrical potential between the anode and the cathode.

2. The electrolyzer cell as defined in claim 1, wherein the gas separation means comprises a gas manifold, wherein the gas manifold comprises a gas conduit disposed therein, fluidly connected to each one of the process stages, arranged for flowing the gas separated from the electrolyte solution through the gas manifold towards the gas outlet.

3. The electrolyzer cell as defined in claim 1, further comprising a plurality of plates, each one of the plurality of plates extending within a respective one of the plurality of process stages, arranged to facilitate a circulation of the electrolyte solution within the respective one of the process stages, wherein each one of the plates separates the respective one of the process stages into an electrolyte flow channel and an electrolyte recycle channel, and wherein the electrolyte flow channel is in fluid communication with the electrolyte recycle channel, thereby allowing the electrolyte solution to circulate between the electrolyte flow channel and the electrolyte recycle channel.

4. The electrolyzer cell as defined in claim 3, wherein each one of the plurality of plates comprises a baffle or a flow deflector.

5. The electrolyzer cell as defined in claim 1, wherein each of the plurality of process stages is in contact with the at least one ion exchange membrane and with the respective one of the anode and the cathode.

6. The electrolyzer cell as defined in claim 1, wherein the fluid inlet fluidly connects a reservoir containing the electrolyte solution to the first process stage.

7. The electrolyzer cell as defined in claim 1, wherein the fluid outlet is positioned at a side of the anode and/or cathode chambers opposite to the gas separation means.

8. The electrolyzer cell as defined in claim 1, wherein each one of the feed ports comprises a longitudinal gap defined along a length of the respective one or more partitions.

9. The electrolyzer cell as defined in claim 3, wherein each one of the feed ports is at a side of a respective one of the one or more partitions facing a respective electrolyte recycle channel.

10. The electrolyzer cell as defined in claim 1, further comprising an electrolyte cooler fluidly connected to two adjacent process stages of the plurality of process stages external or internal of the electrolyzer cell, arranged to cool the electrolyte solution from one process stage of the plurality of process stages to an adjacent subsequent one of the process stages of the plurality of process stages.

11. An electrolyzer cell comprising:
an anode chamber;
an anode exposed in the anode chamber;
a cathode chamber;
a cathode exposed in the cathode chamber;
at least one ion exchange membrane separating the anode chamber and the cathode chamber;
one or more partitions in at least one of the anode chamber or the cathode chamber, dividing the at least one of the chambers into a plurality of process stages comprising a first process stage and one or more subsequent process stages, wherein opposing first and second ends of each one of the one or more partitions, the first and second ends being opposing terminal ends of the partition, are sealed to respective first and second walls of the respective anode and cathode chambers, thereby preventing a flow of fluid between the terminal ends of each one of the partitions and the respective first and second walls of the anode and cathode chambers,
a plurality of plates, each one of the plurality of plates arranged substantially perpendicular to the respective one of the one or more partitions, dividing each one of the respective process stages into an electrolyte flow channel and an electrolyte recycle channel, the electrolyte flow channel being in fluid communication with the electrolyte recycle channel, thereby allowing the electrolyte solution to circulate between the electrolyte flow channel and the electrolyte recycle channel;
a feed port positioned at a point between the first and second ends of a respective one of the one or more partitions along a side of the respective one of the one or more partitions facing a respective one of the electrolyte recycle channel, arranged for flowing the electrolyte solution sequentially through each one of the process stages, from the first process stage through to a final one of the one or more subsequent process stages;
a fluid inlet at the first process stage arranged for supplying the electrolyte solution into the first process stage;
a fluid outlet at the final one of the one or more subsequent process stages arranged for discharging the electrolyte solution;
a gas outlet fluidly connected to one or more of the plurality of process stages arranged for discharging a gas produced at the plurality of process stages; and
means for connecting a power source to apply an electrical potential between the anode and the cathode.

12. The electrolyzer cell as defined in claim 11, wherein the plurality of plates each comprises a baffle or a flow deflector.

13. The electrolyzer cell as defined in claim 11, further comprising a gas separation means for separating a gas from the electrolyte solution at each of the process stages.

14. The electrolyzer cell as defined in claim 13, wherein the means comprises a gas manifold extending along a side of one or both of the anode chamber and the cathode chamber, wherein the gas manifold is arranged to be exposed in each one of the process stages.

15. The electrolyzer cell as defined in claim 14, wherein the gas manifold comprises a gas conduit disposed therein, fluidly connected to each one of the process stages, arranged for flowing the gas separated from the electrolyte solution through the gas manifold towards the gas outlet.

16. The electrolyzer cell as defined in claim 11, wherein the fluid inlet fluidly connects a reservoir containing the electrolyte solution to the first process stage.

17. The electrolyzer as defined in claim 11, wherein the fluid outlet is positioned at a side of the anode and/or cathode chambers opposite to the gas separation means.

18. The electrolyzer cell as defined in claim 11, wherein each of the feed ports comprises a longitudinal gap defined along a length of the respective one of the one or more partitions.

19. The electrolyzer cell as defined in claim 11, further comprising an electrolyte cooler fluidly connected to two adjacent process stages of the plurality of process stages external or internal of the electrolyzer cell, arranged to cool the electrolyte solution from one process stage of the plurality of process stages to an adjacent subsequent one of the process stages of the plurality of process stages.

20. An electrolyzer cell comprising:
an anode chamber;
an anode exposed in the anode chamber;
a cathode chamber;
a cathode exposed in the cathode chamber;
at least one ion exchange membrane separating the anode chamber and the cathode chamber;
one or more partitions in at least one of the anode chamber or the cathode chamber, dividing the at least one of the chambers into a plurality of process stages comprising a first process stage and one or more subsequent process stages, wherein opposing first and second ends of each one of the one or more partitions are sealed to respective first and second walls of the respective anode and cathode chambers, the first and second ends being opposing terminal ends of the partition, thereby preventing a flow of fluid between the terminal ends of each one of the partitions and the respective first and second walls of the anode and cathode chambers;
a plurality of plates, each one of the plurality of plates arranged substantially perpendicular to a respective one of the one or more partitions, dividing each one of the respective process stages into an electrolyte flow channel and an electrolyte recycle channel, the electrolyte flow channel being in fluid communication with the electrolyte recycle channel, thereby allowing an electrolyte solution to circulate between the electrolyte flow channel and the electrolyte recycle channel;
a gas separation means extending along the plurality of process stages, arranged to separate a gas from the electrolyte solution circulated from the electrolyte flow channel at each one of a respective one of the process stages;
a feed port positioned at a point between the first and second ends of a respective one of the one or more partitions along a side of the respective one of the one or more partitions facing a respective one of the electrolyte recycle channel, arranged for flowing the electrolyte solution sequentially through each one of the process stages, from the first process stage through to a final one of the one or more subsequent process stages;
a fluid inlet at the first process stage arranged for supplying the electrolyte solution into the first process stage;
a fluid outlet at the final one of the one or more subsequent process stages arranged for discharging a gas-separated electrolyte solution;
a gas outlet fluidly connected to the gas separation means for discharging the separated gas; and
means for connecting a power source to apply an electrical potential between the anode and the cathode.

21. A three-cell compartment electrolyzer cell comprising:
an anode chamber;
an anode exposed in the anode chamber;
a cathode chamber;
a cathode exposed in the cathode chamber;
a middle chamber;
a first ion exchange membrane separating the anode chamber and the middle chamber;
a second ion exchange membrane separating the cathode chamber and the middle chamber;
one or more partitions in at least one of the anode chamber or the cathode chamber, dividing the at least one of the anode chamber and cathode chamber into a plurality of process stages comprising a first process stage and one or more subsequent process stages, wherein opposing first and second ends of each one of the one or more partitions, the first and second ends being opposing terminal ends of the partition, are sealed to respective first and second walls of the respective anode and cathode chambers, thereby preventing a flow of fluid between the terminal ends of each one of the partitions and the respective first and second walls of the anode and cathode chambers;
a plurality of plates, each of the plurality of plates arranged substantially perpendicular to a respective one of the one or more partitions, dividing each one of a respective plurality of process stages into an electrolyte flow channel and an electrolyte recycle channel, the electrolyte flow channel being in fluid communication with the electrolyte recycle channel, thereby allowing an electrolyte solution to circulate between the electrolyte flow channel and the electrolyte recycle channel;
a gas separation means extending along the plurality of process stages, arranged to separate a gas from the electrolyte solution circulated from the electrolyte flow channel at each one of the process stages;
a feed port positioned at a point between the first and second ends of the respective one of the one or more partitions along a side of the respective partition facing the respective one of the electrolyte recycle channel, arranged for flowing the electrolyte solution sequentially through each one of the process stages, from the first process stage through to a final one of the one or more subsequent process stages;
a fluid inlet at the first process stage arranged for supplying the electrolyte solution into the first process stage;
a fluid outlet at the final one of the one or more subsequent process stages arranged for discharging a gas-separated electrolyte solution;
a gas outlet fluidly connected to the gas separation means for discharging the separated gas; and
means for connecting a power source to apply an electrical potential between the anode and the cathode.

22. The electrolyzer cell as defined in claim 21, wherein the each one of the plurality of plates comprises a baffle or a flow deflector.

23. The electrolyzer cell as defined in claim 21, wherein the gas separation means comprises a gas manifold.

24. The electrolyzer cell as defined in claim 23, wherein the gas manifold comprises a gas conduit disposed therein, fluidly connected to each one of the process stages, arranged for flowing the gas separated from the electrolyte solution through the gas manifold towards the gas outlet.

25. The electrolyzer cell as defined in claim 21, wherein the fluid inlet fluidly connects a reservoir containing the electrolyte solution to the first process stage arranged for supplying the electrolyte solution into the first process stage.

26. The electrolyzer cell as defined in claim 21, wherein the fluid outlet is positioned at a side of the anode and/or cathode chambers opposite to the gas separation means.

27. The electrolyzer cell as defined in claim 21, wherein each of the feed ports comprises a longitudinal gap defined along a length of the respective one or more partitions.

* * * * *